Jan. 18, 1966  J. A. TURGEON  3,230,293
FORCED COOLED ISOLATED PHASE BUS SYSTEM USING INTERNAL BLOWERS
Filed Aug. 26, 1963  2 Sheets-Sheet 1
FIG. 1 — PRIOR ART
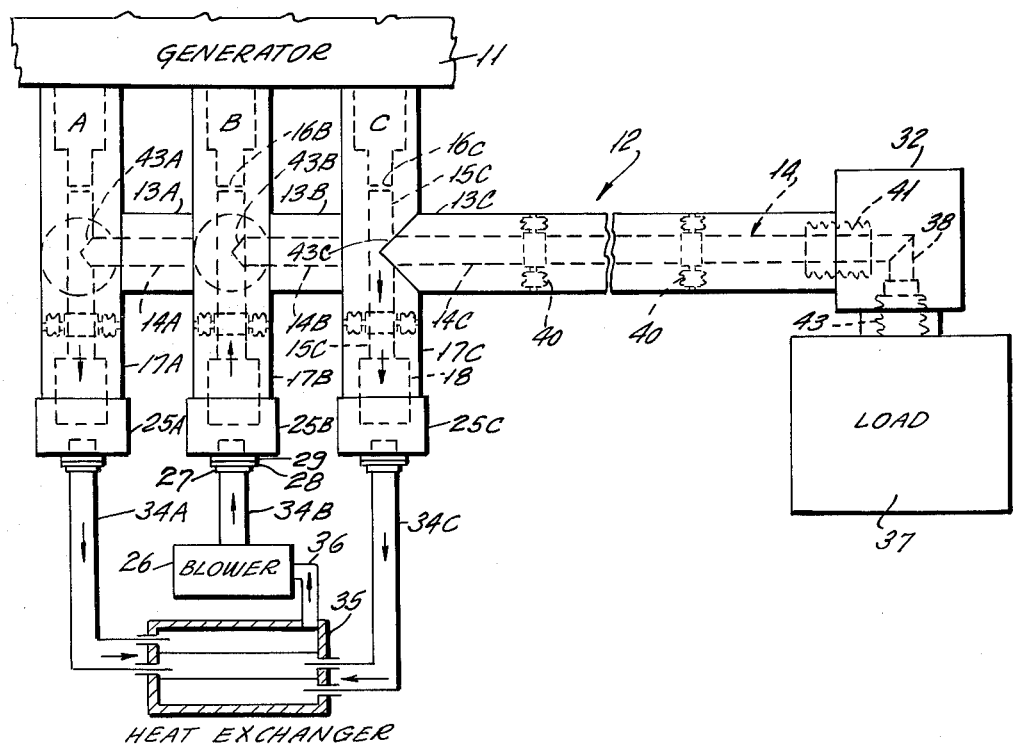
FIG. 4
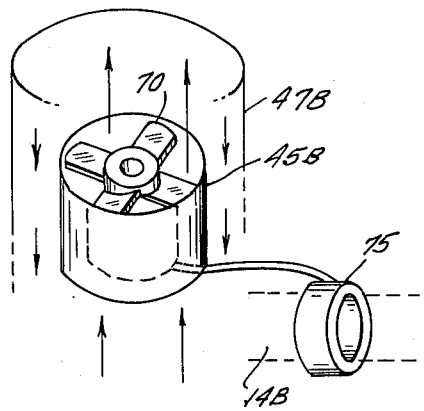
INVENTOR.
JOSEPH A. TURGEON
BY
OSTROLENK, FABER, GERB & SOFFEN
ATTORNEYS

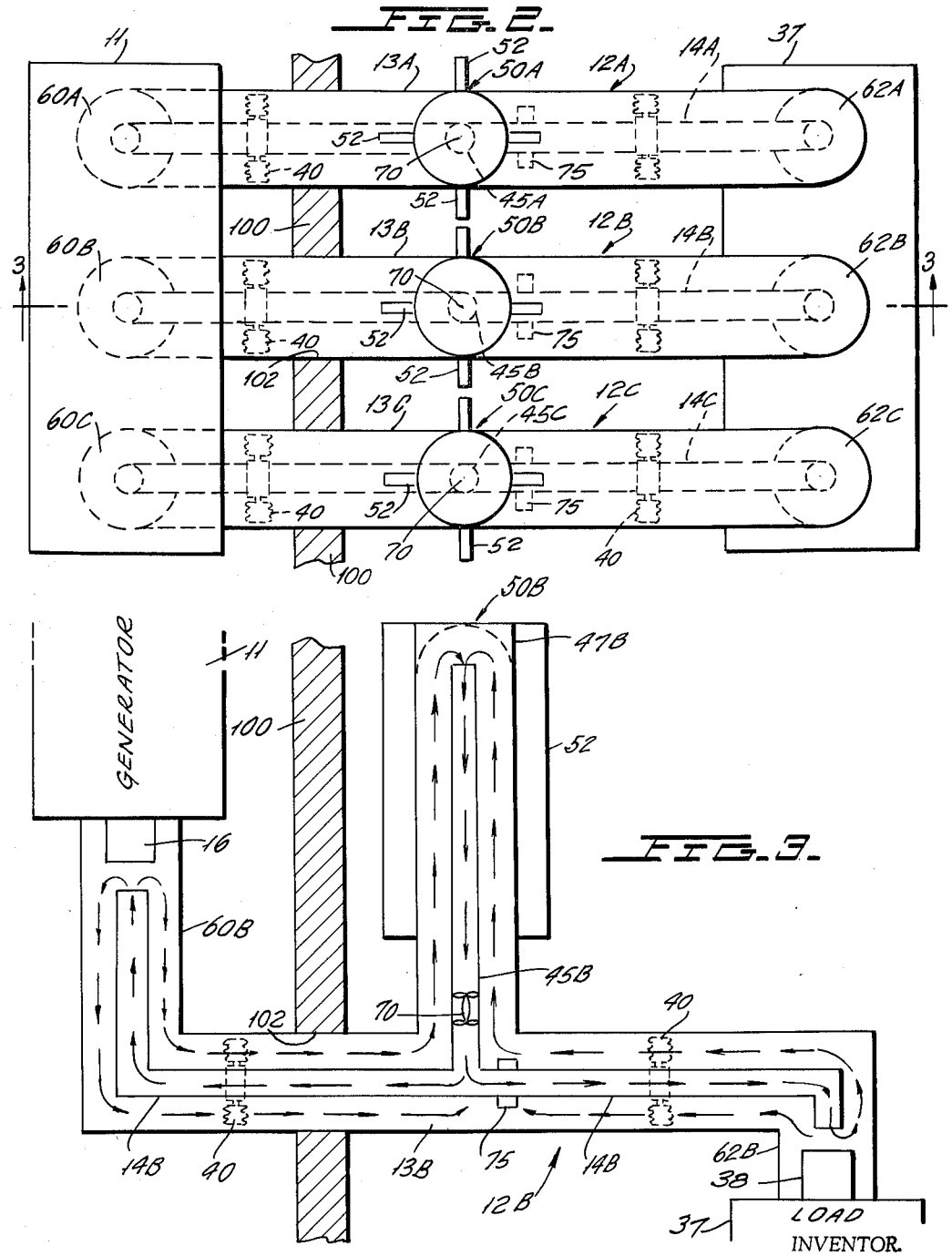

United States Patent Office 3,230,293
Patented Jan. 18, 1966

1

3,230,293
FORCED COOLED ISOLATED PHASE BUS
SYSTEM USING INTERNAL BLOWERS
Joseph A. Turgeon, Toronto, Ontario, Canada, assignor
to I-T-E Circuit Breaker (Canada) Limited, Port Credit,
Ontario, Canada, a limited-liability company
Filed Aug. 26, 1963, Ser. No. 304,464
11 Claims. (Cl. 174—16)

My invention relates to an arrangement for cooling the conductors of an isolated phase bus system, and more particularly to a forced cooled system wherein a coolant is controllably circulated by blowers or fans located internally of the phase bus. Individual blowers are preferably provided for each of the phase buses with flow rate being advantageously controlled responsive to phase load current, thereby maintaining the temperature of the phase bus within predetermined limits.

In isolated phase bus systems, the individual electrical conductors of the various phases are each confined within separate housings, with the outside of the conductors being spaced from their respective housings so that an air space of considerable thickness is formed between the conductor and the housing. Such arrangements are typically shown by U.S. Patent Nos. 2,293,310 issued August 18, 1942; Reissue 23,811 issued March 30, 1954; 2,706,744 issued April 19, 1955; 2,775,642, issued December 25, 1956; 2,861,119 issued November 18, 1958; and 2,953,623 issued September 20, 1960, all assigned to the assignee of the instant invention.

Such an isolated phase bus system is typically used to conduct an appreciable current magnitude, as between the generator and primary transformer winding of the switching station. The passage of such appreciable current through the conductors results in considerable heat generation thereof because of the I²R losses within the conductors. As the temperature rises, so does the resistance of the conductor material. This rising resistance increases the IR or potential drop of the line, thus lowering the voltage supply to the load and also increasing the I²R or power loss, which in turn generates more heat. The increased heat causes the conductors to expand, setting up mechanical stresses and in extreme cases the conductors themselves have been known to melt.

Heat is transferred from the bus conductor by convection and to a much lesser degree by radiation. However, the convection cooling process is impeded by the fact that the space between the conductor and the housing is filled with dead air which tends to act as a thermal insulating barrier.

The heating problem may be somewhat alleviated by increasing the size of the conductors which would reduce the resistance thereof and increase the radiating surfaces. However, the cost of copper or other good electrical conductors are quite high, and such larger conductors would necessitate correspondingly larger housings, thus necessitating an increase in the size and weight of the installation to the point where fabrication and installation present major practical problems. The disadvantages of this approach are more fully discussed in aforementioned U.S. Patent No. 2,861,119.

It is also known to increase the current capacity of the isolated phase bus of a given system by forced convection cooling the individual bus members thereof in conjunction with externally located blowers and heat exchangers, with a typical such arrangement of force convection cooling of the conductors being shown in aforementioned U.S. Patent No. 2,953,623. Such prior art forced cooling systems typically circulate the same coolant through all the phases in conjunction with a single blower. More specifically, the coolant, such as air or hydrogen, is first introduced to one of the phase buses, such as the center phase; with the coolant then being circulated to the other phases; and returned to the heat exchanger after passing through the conductors of the other phase buses. This arrangement disadvantageously requires substantial duct work external to the phase bus, thereby increasing both its complexity and fabrication cost. Further, such external duct work makes is especially cumbersome to provide a delta connection at the power transformer end of the isolated phase bus system run.

The prior art forced cooling arrangement of introducing the coolant in one phase bus and returning it through the other phase buses disadvantageously fails to provide complete phase isolation, such that should a ground fault occur in one of the phases it is possible for the ionized coolant common to all the phases of the circulating system to initiate a phase to phase fault.

My invention advantageously avoids the above difficulties, by providing individually controlled coolant circulation of each of the phase buses by blower means located internally of the phase bus. More specifically, I control the coolant flow by one or more axial fans positioned within the hollow current carrying conductor of the individual phase bus. These fans force circulate in coolant to a simplified heat exchanger means located in close proximity to the phase bus, and separately operable in conjunction with each of the phase buses. Accordingly, I provide increased phase isolation in a simplified and improved manner than the heretofore practiced forced convection cooling arrangements for isolated phase bus systems.

As a particularly advantageous aspect of my invention, the forced cooling provided by the blower means is individually excited by a means directly responsive to the associated phase load, thereby controllably varying the coolant flow responsive to individual phase bus load conditions to maintain the temperature of the phase bus within predetermined limits. More specifically, I provide a current transformer about the load carrying phase bus conductor, such that as the load increases correspondingly more power is supplied to the fan to so increase the coolant flow.

It is therefore seen that the basic concept of my invention resides in providing forced cooling of an isolated phase bus system by blower means internally located within the individual phase bus conductors, and preferably actuated by energizing means directly responsive to the phase load.

Accordingly, a primary object of my invention is to provide forced cooling of an isolated phase bus system in an improved manner.

Another object of my invention is to provide a cooling arrangement for an isolated phase bus system, wherein individual blower means are internally located within the phase bus conductors.

An additional object of my invention is to provide a cooling arrangement for an isolated phase bus system, wherein each of the phase conductors are cooled by a separate closed cycle arrangement, to thereby provide increased phase isolation.

A further object of my invention is to provide a closed cycle forced cooled isolated phase bus system wherein internally located blowers of each phase bus run are separately controlled responsive to their associated phase load.

Still another object of my invention is to provide a closed cycle forced cooled isolated phase bus system, wherein controlled coolant flow is provided about both the internal and external surfaces of the hollow load carrying conductor by individual blower means located internal of the phase bus.

Still an additional object of my invention is to provide such a closed cycle cooling arrangement including individual heat exchanger means for each of the phase buses, located in close proximity to the current carrying members, to thereby avoid extensive duct arrangements external to the phase bus system.

These as well as other objects of my invention will readily become apparent upon a consideration of the following description and accompanying drawings in which:

FIGURE 1 is a plan view of a typical prior art forced convection cooling arrangement utilizing externally located blower and heat exchanger means interconnected to all the phases.

FIGURE 2 is a plan view of a forced cooled isolated phase bus arrangement constructed in accordance with the teachings of my invention.

FIGURE 3 is a cross-sectional view along lines 3—3 of FIGURE 2, and looking in the direction of the arrows, showing a side elevation of my coolant flow system in conjunction with one phase of the isolated phase bus system.

FIGURE 4 is a simplified perspective view showing the circulating blower means and phase load responsive excitation thereof in accordance with the preferred teachings of my invention.

Reference is first made to FIGURE 1 which shows a typical prior art cooling arrangement for isolated phase bus systems, as may be the type more fully shown and discussed in aforementioned U.S. Patent 2,953,623. Such isolated phase bus systems are typically used to conduct electrical power from one point to another, where large power concentrations are present, as between generator 11 and load 37, which is usually the primary of a main transformer. Isolated phase bus structure 12 is shown as a three phase arrangement, with each phase being substantially identical in construction to the other phases. Accordingly, for the sake of simplicity only the detailed structure of one of the phases will be described.

Each phase of the isolated bus structure 12 consists of a hollow conductor 14 typically of circular or other convenient cross-sectional area (determined by system parameters and structural considerations) enclosed within the similarly cross-sectioned housing 13. The conductor is centrally located in housing 13 and insulated therefrom by means of suitable insulators generally shown as 40. The end of housing 13 nearest the generator 11 is shown connected at right angles to another housing 17, which housing and the duct work associated therewith are necessitated by the coolant flow system. The other end of housing 13 is secured to the coolant transfer box 32 which is provided to circulate the same coolant between the phases A, B, C. The end of conductor 14 nearest generator 11 is secured at right angles to hollow conductor 15 to form a fluid tight good electrical connection therewith. An appropriate shaped opening in conductor 15 provides a continuous passage through the centers of conductors 14 and 15 to operate in conjunction with the forced coolant flow arrangement of that system. The other end of conductor 14, projecting into cooling transfer box 32, requires a closely fitted bushing 41 to form a fluid tight joint therebetween. This end of conductor 14 is electrically connected to load terminal 38, entering transfer box 32 through additional insulated bushing 43 to form a fluid tight joint therebetween.

One end of each of the conductors 15a, 15b, 15c is connected to the appropriate generator terminal A, B, C with a solid baffle 16 being provided to close off that end of the conductor 15 in a manner preventing communication between the fluid cooling the bus structure and the fluid usually provided to cool the generator 11. The other end of conductor 15 is received by bushing 18, which in turn is secured to coolant flow housing 25 to form a fluid-tight connection therewith.

The exhaust or output port of an externally located blower 26 is connected via duct 34B to the coolant flow housing 25B of the central phase by means of a fluid-tight joint provided by collar 27, flange 28 and gasket 29. It is to be noted that the coolant flow is directed by blower 26 to the central phase B only of the isolated phase bus system. The coolant, after being introduced in central phase B, circulates therethrough and then to phases A and C (with the transfer to those phases taking place at coolant transfer box 32) and then circulates through phases A and C returning to heat exchanger 35 via ducts 34A, 34C connected from coolant flow housing 25A, 25C to the input of heat exchanger 35. The exhaust or output port of heat exchanger 35 is connected to the intake or input port of blower 35 through duct 36.

Accordingly, such prior art forced cooling arrangement involves the coolant circulation as indicated by the direction of the arrows, wherein the coolant enters only one of the phases. Baffle 16B at the generator end of housing section 17B blocks the passage at the end of conductor 15B to cause the coolant to flow through opening 43B to conductor 14B. At the load end of conductor 14B the coolant enters the fluid transfer box 32 where it splits into two paths (passing through appropriate filter screens) directed through the centers of conductors 14A and 14C. The coolant is then led back to the heat exchanger 35 through conductors 15A and 15C, housings 25A and 25C, and then through external ducts 34A and 34C. The heated coolant is then cooled in heat exchanger 35 and led to the intake of blower 26 through duct 36, where the above-described circulation through the system is repeated.

It will be noted that this system requires the necessity of rather expensive and complicated duct work (as for example ducts 34A, 34B, 34C); coolant flow housing 25A, 25B, 25C; fluid transfer box 32; and the additional housing section 17. Further, such additional members have been found to necessitate a substantial increase in fabrication costs over systems not having a forced coolant flow arrangement. Moreover, the circulation of the same coolant between all of the buses (as for example from phase B to phases A and C prior to returning to the heat exchanger) increases the probability of phase-to-phase faults, resulting from ionized coolant being carried from a phase having a phase-to-ground fault. As another disadvantage of this arrangement, the same blower is used to circulate the coolant through all of the phases with the coolant first circulating through phase B and then being transferred to phases A and C prior to its return to the heat exchanger 35. Accordingly, the flow rate must be adjusted to properly dissipate the heat generated in that phase having the greatest heat rise, with there being excessive coolant flow in phases having a lesser heat rise, thereby necessitating increased rating and power consumption of the blower and heat exchanger.

As will now be shown in conjunction with FIGURES 2–4, wherein like numbers have been used to designate corresponding members of FIGURE 1, my arrangement advantageously provides individual control of each of the phase buses 12A, 12B and 12C through an individual blower means 70 located internal of each of the phase buses and operatively connected to individual phase heat exchanger means 50A, 50B, 50C located in close proximity to the phase bus of the isolated phase bus systems.

Each of the phase buses 12A, 12B and 12C shown in FIGURE 2 connected intermediate generator 11 and load 37 are identically constructed, and accordingly for the sake of brevity only one such phase, as for example 12B, will be described. Phase bus 12B extends upwardly at section 60 at the generator end and is appropriately connected to generator terminal 16 in a manner preventing communication between the fluid cooling the bus structure and the fluid usually provided for cooling the generator. The generator 11 is typically located within an enclosed building, with phase bus 12B extending through suitable aperture 102 in wall 100 to the externally located load transformer 37. Phase bus 12B typically extends downwardly at section 62 to provide an appropriate connection to load terminal 38. At a point intermediate the generator and load ends of phase bus 12B, a heat exchanger tap-off is provided with central hollow conductor 45B being interconnected to phase bus conductor 14B and housing 47B being interconnected to phase bus housing 13B. Appropriate filter screens (not shown) may also be provided within the coolant flow circulating system to clean the coolant.

Heat exchanger 50B provides a closed cycle coolant system about the extension of members 45B and 47B, with fins 52 or other appropriate means being provided to effect heat transfer of the coolant flowing therein to the ambient surroundings. Radiating fins 52 may be provided along members 45B and 47B since there is substantially no magnetic field in this region to cause circulating currents. The diameter of heat exchanger central conducing member 45B may typically be $\sqrt{2}$ times the diameter of phase conductor 14B, but formed of a thinner gage material inasmuch as it carries substantially no current (conductor 45B having a potential only corresponding to its location intermediate generator and load ends of the phase bus). Housing 47B typically is of the same diameter as housing 13B but also of a thinner gage material as the main phase housing since it also will have substantially no circulating currents.

In accordance with the advantageous teaching of my invention, a blower means, such as aerofoil fan 70, is internally located within hollow conductor 45B to provide forced coolant circulation completely about phase bus conductor 14B. Although one such fan 70 is shown, a number of such fans may be distributed along the phase bus run of conductors 14B and 45B with such multi-stage axial flow fans preferably providing high pressure coolant flow. The energization of fan 70 is preferably provided by a load responsive excitation means such as current transformer 75 located about phase bus conductor 14B. Hence, the power input to fan 70, and accordingly the forced coolant flow rate provided thereby, will be responsive to the magnitude of phase load to maintain a predetermined temperature rise, as is discussed below.

The operation of my novel cooling arrangement will now be described using air for the coolant, with it being understood that other coolants such as hydrogen or any other suitable fluid coolant may likewise be used.

The characteristics of the current transformer 75 and axial fan 70 are chosen in conjunction with the requisite cooling, such that at low values of phase load the fan will be inoperative, thereby permitting free convection flow to dissipate the heat. As the load increases, the excitation supplied to fan 70 by current transformer 75 effects operation thereof, whereby the cooled air is brought in from heat exchanger 50B through the central opening of conductor 45B and is directed in opposite directions through the central openings of phase conductor 14B. The air leaving the central opening of conductor 14B at generator and load regions 60, 62 respectively then flows intermediate the outside surface of central conductor 14B and housing 13B back to intermediately located heat exchanger member 50B, wherein it is then moved upward under the influence of circulating fan 70, and cooled by the radiating fin section 52. The cooled air is then returned to the central opening of central member 45B to initiate another closed cycle of operation.

It is therefore seen that my invention permits individual coolant flow operation of each of the circulatory systems of the various phases, with the coolant flow rate thereof being directly responsive to phase load. This advantageously provides more efficient cooling in a much more simplified manner than has been heretofore provided by the forced convection cooling arrangements of the prior art, which typically introduce the coolant in one of the phases, circulate the coolant to the other phases, and return the coolant to the externally located blower and heat exchanger units via the other phases, with complicated and expensive duct runs being necessitated.

In the foregoing I have described my invention in conjunction with a preferred embodiment thereof. It is naturally understood that many variations and modifications of the principles of my invention will now be obvious to those skilled in the art, and I prefer therefore to be limited not by the specific disclosure herein but only by the appended claims.

The embodiments of the invention in which an exclusive privilege or property is claimed are defined as follows:

1. A forced cooled isolated phase bus system having a first and second end; each phase bus comprising a hollow conductor and a housing; said hollow conductor being supported internally of said housing and in spaced relationship therewith; a blower means located internally of said phase bus for forcing a coolant between said first and second ends for cooling of said phase bus, blower excitation means internal of said phase bus, and operatively connected between its respective phase bus and blower means for providing energization of said blower means from said phase bus.

2. A forced cooled isolated phase bus system, as set forth in claim 1, further including heat exchange means operatively connected to said individual phase bus; said blower means forceably circulating a coolant through the interior of said hollow conductor; the region intermediate the exterior of said hollow conductor and the interior of said housing; to said heat exchange means and from said heat exchange means back through the interior of said hollow conductor, thereby providing phase isolated cooling of said phase bus.

3. A forced cooled isolated phase bus system, as set forth in claim 2; said blower means comprising at least one fan located internally of said hollow conductor.

4. A forced cooled isolated phase bus system, as set forth in claim 1; said blower means comprising at least one fan located internally of said hollow conductor.

5. A forced cooled isolated phase bus system, as set forth in claim 1, said blower excitation means including means proportionally responsive to the load of its associated phase conductors, whereby the operation of said phase located blower means is controllably varied responsive to phase load conditions to maintain the temperature of said phase bus within predetermined limits.

6. A forced cooled isolated phase bus system as set forth in claim 1, further including heat exchange means operatively connected to an individual phase bus and in close proximity to the phase conductor thereof; said blower means forceably recirculating a coolant through the interior of said hollow conductor; the region intermediate the exterior of said hollow conductor and the interior of said housing; to said heat exchange means; and from said heat exchange means back to the interior of said hollow conductor; thereby providinng closed cycle phase isolated closed cycle cooling of said phase bus.

7. A forced cooled isolated phase bus system, as set forth in claim 1, said excitation means comprising a current transformer in load responsive relationship with said hollow conductor.

8. A closed cycle forced cooled isolated phase bus system having a first, a second and a third phase; each phase bus comprising a hollow conductor and a housing about said conductor; said hollow conductor being supported internally of said housing and in spaced relationship therewith; each of said phase buses having a first and second end; individual blower means for each of said phase buses located internally of its respective phase bus for forcing a coolant between said first and second ends; individual blower excitation means internal of said phase bus, and operatively connected between its respective phase bus and blower means for providing energization of said blower means from said phase bus; individual heat exchange means operatively connected to each of said phase buses; each of said blower means individually circulating a coolant through its respective phase between said first and second ends; to said heat exchange means; and from said heat exchange means back to its respective phase bus thereby providing phase isolated closed cycle cooling of said phase bus.

9. A closed cycle forced cooled isolated phase bus system having a first, a second and a third phase; each phase bus comprising a hollow conductor and a housing about said conductor; said hollow conductors being electrically connected between a main transformer primary and a generator, a first and second ends thereof, respectively; said hollow conductors being supported internally of said housing and in spaced relationship therewith; individual blower means for each of said phase buses located internally of its respective phase bus for forcing a coolant between said first and second ends; individual blower excitation means internal of said phase bus, and operatively connected between its respective phase bus and blower means for providing energization of said blower means from said phase bus; individual heat exchange means operatively connected to each of said phase buses; each of said blower means forceably recirculating a coolant through its respective phase bus between said first and second ends; to said heat exchange means; and from said heat exchange means back to its respective phase bus thereby providing individual phase isolated cooling of said phase bus.

10. A closed cycle forced cooled isolated phase bus system, as set forth in claim 9, said blower excitation means including means proportionally responsive to the load of its associated phase conductor, whereby the operation of each of said blower means is controllably varied responsive to load conditions to maintain the temperature of the phase bus within predetermined limits.

11. A closed cycle forced cooled isolated phase bus system, as set forth in claim 10, wherein said blower means comprises a fan located internally of said hollow conductor; said excitation means comprising a current transformer in load responsive relationship with said hollow conductor of its respective phase bus; the output of said current transformer providing said controlled operation, whereby the coolant flow rate of said fan is automatically adjusted responsive to its individual phase load.

References Cited by the Examiner

UNITED STATES PATENTS 2,640,101  5/1953  Hughes _____ 174—16
2,861,119  11/1958 Collonge _____ 174—24

JOHN F. BURNS, *Primary Examiner.*

DARRELL L. CLAY, *Examiner.*